Nov. 9, 1954 W. BOYD 2,693,904
AIR BLEED FOR COMPRESSORS
Filed Nov. 14, 1950 2 Sheets-Sheet 1
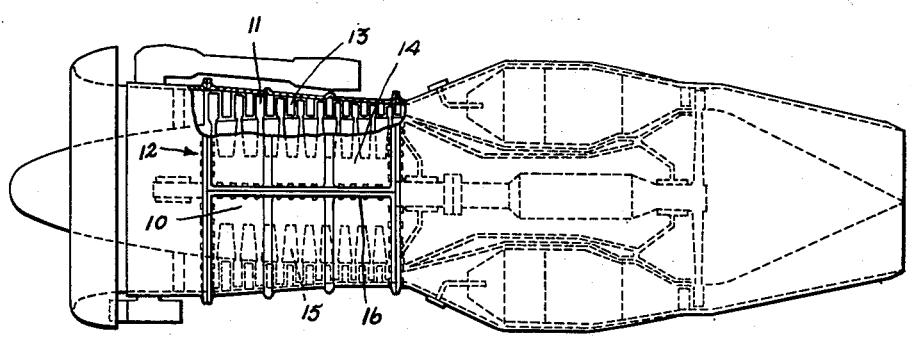
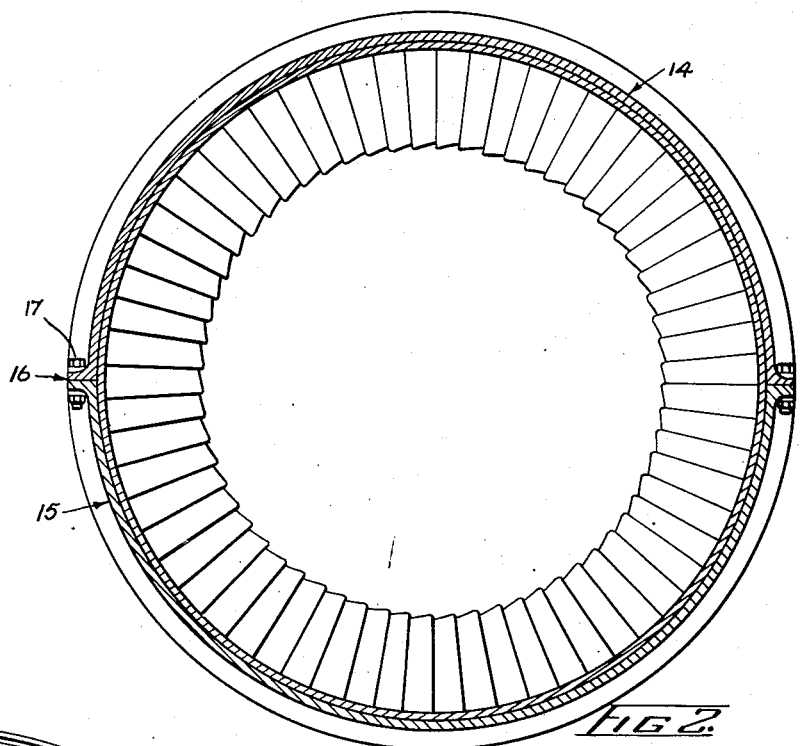
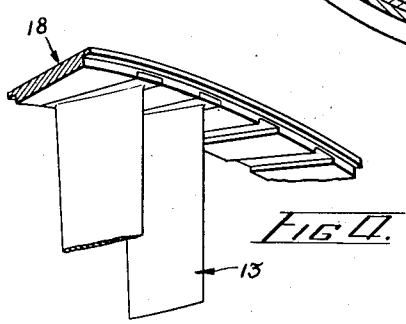
INVENTOR
WINNETT BOYD
PER
ATTORNEY

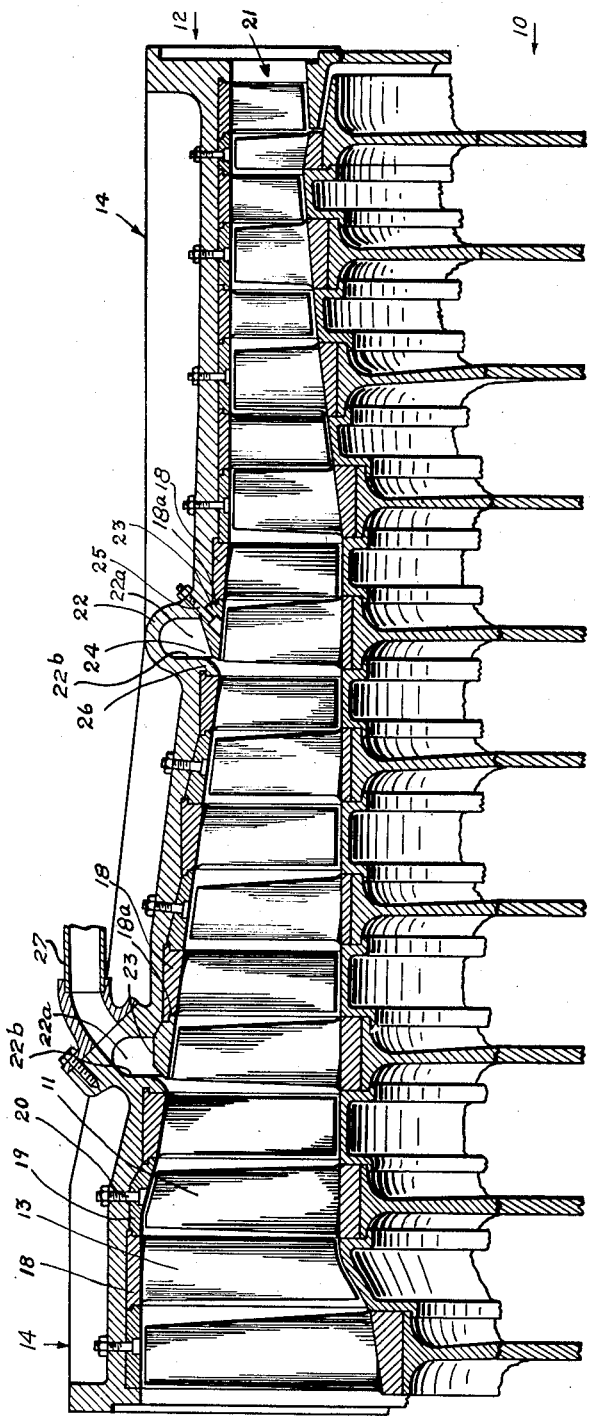

United States Patent Office 2,693,904
Patented Nov. 9, 1954

2,693,904

AIR BLEED FOR COMPRESSORS

Winnett Boyd, Bobcaygeon, Ontario, Canada, assignor to A. V. Roe Canada Limited, Malton, Peel, Ontario, Canada, a corporation Application November 14, 1950, Serial No. 195,573

8 Claims. (Cl. 230—122)

This invention relates to air bleed means for compressors and more particularly to compressors used in gas turbine engines.

It is often desirable in such engines, particularly in axial flow engines used for aircraft propulsion, to provide the means for bleeding air from an intermediate stage of the compressor. The usual method of doing this in the past has been to provide a series of slotted bleed openings, spaced around the circumference of the compressor casing, through which pressurized air can be drawn and thence ducted away as required. Of necessity, these slotted openings have had to be located at spaced intervals around the casing rather than being contiguous in order that the strength and rigidity requirements of the compressor casing might be met. So spacing them, however, results in disturbance of the air flow in the compressor downstream from the bleed outlets due to the uneven drain of air around the circumferential boundary of the air stream. Further, as those skilled in the art will readily appreciate, the presence of a series of interrupted circumferential openings adjacent the path of the rotating compressor blades increases the likelihood of aerodynamic vibration being induced in the air stream through the compressor, with attendant undesirable acoustical effects and risk of sympathetic vibration in the compressor components.

It is the principal object of this invention to provide an air bleed for a compressor which permits a smooth undisturbed flow of air through the compressor downstream from the bleed outlets.

It is a further object of this invention to provide the means whereby air of one pressure may be bled uniformly from the full circumference of a compressor casing.

It is a still further object of this invention to provide means whereby air may be bled from the compressor of a gas turbine engine, said means forming a structural part of the compressor casing of the engine whereby hoop stresses in the said casing are relieved.

In the accompanying drawings forming a part of this description and in which like reference characters are employed to designate like parts throughout the same:

Fig. 1 is a side elevation of a gas turbine engine embodying a compressor having an air bleed in accordance with this invention;

Fig. 2 is a typical enlarged cross-section of a stator casing showing the general arrangement of the upper and lower halves;

Fig. 3 is an enlarged sectional view of a portion of the compressor; and

Fig. 4 shows a typical method of mounting the stator blades in the stator casing.

In accordance with well known practice the compressor comprises a rotor assembly consisting of a rotor drum 10 carrying rows of outwardly extending blades 11, and a stator casing assembly 12 carrying rows of inwardly extending blades 13 interposed between the rows of rotor blades.

The stator casing assembly consists of a cylindrical shell split along an axial plane to form two similar halves 14 and 15 held together at their flanges 16 by longitudinal rows of bolts 17. A plurality of stator blades 13, in accordance with conventional practice, are held in substantially longitudinally extending dovetailed slots in semicircular mounting rings 18 (Figure 4); the mounting rings conform to the shape of the inner periphery of the shell and carry oppositely-directed axially-extending flanges. These rings alternate with longitudinally interposed spacer rings 19 which mate with the flanges of the mounting rings 18, thereby completing the peripheral wall of the shell between the mounting rings and preventing longitudinal displacement of the stator blades 13 on the mounting rings. The spacer rings 19 themselves are attached to the stator shell by means of eccentric-headed bolts 20 machined flush with the inner surfaces of their corresponding rings. The inner surfaces of the mounting rings 18 and the spacer rings 19, in conjunction with the outer surfaces of the rotor drum 130, define a smooth-walled annular passage 21 through which flows the main stream of air passing through the compressor. The stator shell is circumferentially ridged with annular bleed ducts 22, each having an annular open side providing a continuous circumferential aperture 22$^a$ defined by wall edges provided on the downstream side of the aperture by the adjacent flanged edge 18$^a$ of the mounting ring 18 located on that side of the aperture and provided on the upstream side of the aperture by the edge 22$^b$ of the part of the stator casing located upstream of the aperture. The said ducts are cast integrally with the shell, their number and location on the compressor being dependent upon the anticipated demand for auxiliary pressurized air. The aperture provided at the annular open side of each duct 22, facing the passage 21, is partially covered by a closure ring 23 which replaces one of the spacer rings 19 and provides a narrow continuous bleed opening 24 around the entire outer circumference of the passage 21. The duct having an internal width substantially greater than the width of the bleed opening 24, therefore provides for a reservoir of relative stable air which enters from the compressor under pressure. The relatively great width of the duct involves a further advantage because a duct of ample proportions is easier to manufacture than a narrower one.

Each closure ring 23 is attached to the stator shell by oblique eccentric-headed bolts 25 machined flush with the inner surface of the rings. The closure rings serve the dual purpose of (a) in certain locations providing extensions of the wall of the passage for restricting the apertures in the wall to provide the narrower bleed openings 24, so that each duct overlies a circumferential strip of the passage well adjacent the corresponding opening, and (b) providing means for retaining the stator blades and mounting rings located immediately downstream of each closure ring to replace this function of the missing spacer ring at the location of each of the ducts 22. To retain the stator blades and mounting ring located immediately upstream of each of the closure rings 23, a lip 26 protruding inwardly from the adjacent edge 22$^b$ of the stator casing to form a forward wall of the bleed opening 24 is provided on the stator shell at the location of each of the ducts. Conduits 27 are provided for disposing of the air collected in the ducts 22.

When the engine is in operation, air is drawn into the annular passage 21 where it is compressed in stages by the successive rows of rotor and stator blades 11 and 13 respectively. Being at a pressure higher than that which prevails in the ducts 22, some of this air is directed into the ducts through the openings 24.

Turbulence is liable to occur in the air stream due to uneven distribution of the flow pattern, and this turbulence is undesirable because it is energy consuming and may result in serious local heating of the compressor casing. It will be appreciated by those skilled in the art that an air bleed of the type described, embodying a continuous peripheral bleed opening or slot gives the maximum bleed area for the minimum slot width and thereby reduces turbulence in the flow of air downstream from the bleed opening as well as providing an even pressure at every point around the circumference of the bleed duct. Aerodynamically, such an intake is ideal in that it draws off the boundary layer across its entire front leaving the dynamic stream of air flowing through the compressor undisturbed.

A continuous slot type of air bleed according to the invention, eliminating as it does circumferential discontinuities in the wall of the annular passage, thereby assures that the rotor blades passing adjacent thereto and downstream thereof are not subjected to aerodynamically induced vibrations and attendant acoustical effects which may eventually result in fatigue failures. Furthermore, structurally the raised ducts form, in effect, hollow ribs on the surface of the shell, thereby contributing to the circumferential strength of the assembly.

It is to be understood that the form of this invention herewith shown and described is to be taken as a preferred example of the same and that various changes in the shape, size and arrangement of the parts may be resorted to without departing from the spirit of the invention or the scope of the subjoined claims.

What I claim as my invention is:

1. In combination, a compressor having walls defining an annular passage through which a stream of air is constrained to flow, at least one of the walls having a continuous circumferential bleed opeing for a portion of said air stream, a continuous annular hollow rib on the said wall projecting radially outside the passage and circumferentially reinforcing the said wall, the rib overlying the opening to collect the said portion of the airstream, the internal width of the hollow rib being substantially greater than the width of the opening whereby the rib also overlies a circumferential strip of the said wall adjacent the opening, and an outlet from the hollow rib.

2. In combination a compressor having a casing surrounding an annular passage through which a stream of air is constrained to flow, a duct circumferentially disposed on the casing and having a continuous circumferential aperture communicating with the passage, a closure ring surrounding the passage at the aperture, the ring being a separate unit removable from the inner side of the casing and secured to the casing, the ring being spaced from one side of the aperture and thus partially closing the aperture to provide a continuous bleed opening, narrower than the aperture, leading into the duct from the passage, and an outlet from the duct.

3. The combination as claimed in claim 2 in which the circumferential surface of the ring facing the passage is flush with the inner side of the casing.

4. In combination, a compressor having a casing providing an annular passage through which a stream of air is constrained to flow and including walls bounding the passage, blades projecting from the casing transversely into the passage, means for mounting the blades in the casing including generally cylindrical mounting rings providing sections of one of the said walls and to which the blades are secured, the mounting rings having flanged edges, the said one wall having a continuous circumferential aperture, a duct circumferentially disposed on the said one wall and overlying the aperture, a closure ring partially closing the aperture and having a flanged edge and another edge, one of the flanged edges of the mounting rings being adjacent one side of the aperture in the said one wall, the flanged edge of the closure ring meeting with the said one of the flanged edges of the mounting rings, the other edge of the closure ring being axially spaced from the other side of the aperture and providing therewith a narrow continuous bleed opening in the wall of the passage, means attaching the closure ring to the casing, and an outlet from the duct.

5. In combination, a compressor having a casing providing an annular passage through which a stream of air is constrained to flow and including walls bounding the passage, one of the walls having a continuous circumferential aperture, a duct circumferentially disposed on the said one wall and overlying the aperture, a closure ring partially closing the aperture and having a flanged edge and another edge, blades projecting from the casing transversely into the passage, means for mounting the blades in the casing including generally cylindrical mounting rings providing sections of the said wall and to which the blades are secured and an annular lip circumferentially disposed on the inside of said one wall and extending transversely of the passage to define one side of the aperture, the mounting rings having flanged edges, one of the flanged edges of the mounting rings being adjacent the other side of the aperture in said one wall, the flanged edge of the closure ring meeting with the said one of the flanged edges of the mounting rings, the other edge of the closure ring being axially spaced from the lip and providing therewith a narrow continuous bleed opening in the wall of the passage, means attaching the closure ring to the casing, and an outlet from the duct.

6. In combination, a compressor having a casing providing an annular passage through which a stream of air is constrained to flow and including walls bounding the passage, one of the walls having a continuous circumferential aperture defined by wall edges spaced apart by the width of the aperture, one of the wall edges being flanged, a duct circumferentially disposed on the said one wall and overlying the aperture, a closure ring partially closing the aperture and having a flanged edge and another edge, the flanged edge of the closure ring mating with the said flanged wall edge defining the aperture, the other edge of the closure ring being axially spaced from the other one of the said wall edges defining the aperture and providing therewith a narrow continuous bleed opening in the said one wall, means attaching the closure ring to the said one wall, and an outlet from the duct.

7. In combination, a compressor having a casing providing an annular passage through which a stream of air is constrained to flow and including walls bounding the passage, one of the walls having a continuous circumferential aperture defined by wall edges spaced apart by the width of the aperture, one of the wall edges being flanged, a duct circumferentially disposed on the said one wall and overlying the aperture, a closure ring partially closing the aperture and having a flanged edge and another edge, the said other one of the said wall edges defining the aperture having an annular lip circumferentially disposed on the said one wall and extending transversely of the passage, the flanged edge of the closure ring mating with the said flanged wall edge defining the aperture, the said other edge of the closure ring being axially spaced from the lip and providing therewith a narrow continuous bleed opening in the wall of the passage, means attaching the closure ring to the said one wall, and an outlet from the duct.

8. In combination, a compressor having a casing providing an annular passage through which a stream of air is constrained to flow and including a radially inner wall and a radially outer wall bounding the passage, axially spaced stages of radially disposed blades projecting from the casing transversely into the passage, means mounting the blades in the casing including axially spaced-apart generally cylindrical mounting rings having flanged edges and providing sections of one of the walls and to which alternate stages of the blades are secured, the other stages of blades being secured to the other of the walls, the said one wall having a continuous circumferential aperture in one of the spaces between adjacent mounting rings, generally cylindrical spacing rings having flanged edges mating with the edges of the mounting rings and providing sections of the said one wall in the other spaces between adjacent mounting rings, a duct circumferentially disposed on the said one wall and overlying the aperture, a closure ring partially closing the aperture and having a flanged edge and another edge, the casing at one side of the aperture having an annular lip circumferentially disposed on the inside of the said one wall and extending transversely of the passage to define one side of the aperture and receiving the edge of one of the mounting rings, an edge of another mounting ring being adjacent the other side of the aperture in the casing, the flanged edge of the closure ring mating with the edge of the said other mounting ring, the other edge of the closure ring being axially spaced from the lip and providing therewith a narrow continuous bleed opening in the said one wall of the passage, means attaching the closure ring to the said one wall, and an outlet from the duct.

References Cited in the file of this patent

UNITED STATES PATENTS

| Number | Name | Date |
| --- | --- | --- |
| 936,114 | Gardner | Oct. 5, 1909 |
| 1,165,922 | Wagner | Dec. 28, 1915 |
| 1,349,886 | Junggren | Aug. 17, 1920 |
| 1,718,250 | Morinville | June 25, 1929 |
| 1,834,452 | Frey | Dec. 1, 1931 |
| 1,958,145 | Jones | May 8, 1934 |
| 2,084,462 | Stalker | June 22, 1937 |
| 2,520,697 | Smith | Aug. 29, 1950 |
| 2,637,488 | Krouse | May 5, 1953 |

FOREIGN PATENTS

| Number | Country | Date |
| --- | --- | --- |
| 210,881 | Switzerland | Nov. 1, 1940 |
| 568,403 | Germany | Jan. 19, 1933 |
| 619,722 | Great Britain | Mar. 14, 1949 |
| 625,299 | Great Britain | June 24, 1949 |